US012434081B2

(12) United States Patent
Lemyre et al.

(10) Patent No.: US 12,434,081 B2
(45) Date of Patent: Oct. 7, 2025

(54) FILTER FOR RESPIRATOR MASK OR OTHER FILTERING APPLICATIONS

(71) Applicant: AIRBOSS ENGINEERED PRODUCTS INC., Acton Vale (CA)

(72) Inventors: Jean-Luc Lemyre, Granby (CA); Jennifer Romero, Bromont (CA)

(73) Assignee: AIRBOSS ENGINEERED PRODUCTS INC., Acton Vale (CA)

( * ) Notice: Subject to any disclaimer, the term of this patent is extended or adjusted under 35 U.S.C. 154(b) by 792 days.

(21) Appl. No.: 15/624,670

(22) Filed: Jun. 15, 2017

(65) Prior Publication Data

US 2018/0001119 A1    Jan. 4, 2018

Related U.S. Application Data

(60) Provisional application No. 62/350,434, filed on Jun. 15, 2016.

(51) Int. Cl.
*A62B 23/02* (2006.01)
*A62B 7/00* (2006.01)
(Continued)

(52) U.S. Cl.
CPC ............... *A62B 23/02* (2013.01); *A62B 7/10* (2013.01); *A62B 18/04* (2013.01); *A62B 18/10* (2013.01);
(Continued)

(58) Field of Classification Search
CPC ........... A62B 19/00; A62B 23/02; A62B 7/10; A62B 18/04; A62B 23/00; B01D 46/30;
(Continued)

(56) References Cited

U.S. PATENT DOCUMENTS 3,934,417 A    1/1976  Wolfe et al.
4,010,014 A *  3/1977  Barnebey ........... B01D 53/0446
                                                    96/108

(Continued)

FOREIGN PATENT DOCUMENTS

| DE | 20108099 U1 | 7/2002 |
| FR | 2728476 A1 | 6/1996 |
| FR | 2764518 A1 | 12/1998 |
| WO | 03090873 A1 | 11/2003 |
| WO | 2006119654 A1 | 11/2006 |
| WO | 2013159797 A1 | 10/2013 |

OTHER PUBLICATIONS

International Search Report, PCT/IB2017/000928, Nov. 14, 2017.

*Primary Examiner* — Margaret M Luarca
(74) *Attorney, Agent, or Firm* — Tanner IP, PLLC

(57) ABSTRACT

Filters for use with protective masks are described, including a container with an interface for removably securing the filter to the exterior of a protective mask, a first mechanical filter screen disposed between an interior of the container and atmosphere, a second mechanical filter screen disposed between an interior of the container and an inner volume of the protective mask, and a filtering medium disposed in the container. The filtering medium includes active particles that are loose, substantially uniform in size, and derived from a polymeric precursor, such as polyvinylidene chloride (PVDC), polyvinylidene fluoride (PVDF), a PVDC copolymer, or a PVDF copolymer. The active particles include metallic additives and organic additives, and a ratio of standard deviation of the active particles' dimensions compared to an average particle dimension may be less than 0.35. Methods of manufacturing such filters, and protective masks including filters with the foregoing features, are also described.

20 Claims, 10 Drawing Sheets

(51) Int. Cl.
  *A62B 7/10*     (2006.01)
  *A62B 18/04*    (2006.01)
  *A62B 18/10*    (2006.01)
  *A62B 19/00*    (2006.01)
  B01D 46/30  (2006.01)
  *B01D 46/00*    (2022.01)
  *B01D 46/10*    (2006.01)
  *B01D 46/62*    (2022.01)
  *B01D 46/64*    (2022.01)

(52) U.S. Cl.
  CPC .............. *A62B 19/00* (2013.01); *B01D 46/30* (2013.01); *B01D 46/0036* (2013.01); *B01D 46/10* (2013.01); *B01D 46/64* (2022.01); *B01D 46/645* (2022.01)

(58) Field of Classification Search
  CPC ................ B01D 46/0024; B01D 46/10; B01D 46/0026; B01D 46/0036; A62D 9/00
  See application file for complete search history.

(56) References Cited

U.S. PATENT DOCUMENTS

| | | | |
|---|---|---|---|
| 5,275,154 A * | 1/1994 | Von Blucher | A62B 23/02 128/205.27 |
| 5,492,882 A | 2/1996 | Doughty et al. | |
| 5,599,764 A | 2/1997 | Sharma et al. | |
| 5,924,420 A * | 7/1999 | Reischel | A62B 18/08 128/206.21 |
| 6,344,071 B1 | 2/2002 | Smith et al. | |
| 7,182,081 B2 | 2/2007 | Reisman | |
| 2006/0196157 A1* | 9/2006 | Greer | B01D 46/30 55/500 |
| 2007/0138444 A1 | 6/2007 | De Ruiter | |
| 2008/0047313 A1 | 2/2008 | Johnson et al. | |
| 2008/0236389 A1 | 10/2008 | Leedy et al. | |
| 2012/0180660 A1* | 7/2012 | Wilson | B01J 20/20 95/148 |
| 2016/0166970 A1* | 6/2016 | Boehringer | B01J 20/226 423/210 |
| 2016/0361679 A1* | 12/2016 | Billingsley | B01J 20/22 |

\* cited by examiner

FILTER FOR RESPIRATOR MASK OR OTHER FILTERING APPLICATIONS

RELATED APPLICATIONS

This application claims priority to U.S. Provisional Application No. 62/350,434, filed Jun. 15, 2016 and entitled FILTER FOR RESPIRATOR MASK OR OTHER FILTERING APPLICATIONS, the contents of which are hereby incorporated for all purposes in their entirety.

BACKGROUND

The invention relates generally to filters for filtering noxious or other undesirable agents, such as filters for respirator masks for chemical, biological, radiological and nuclear (CBRN) protection and filters for other filtering applications.

Filters for removing noxious or otherwise undesirable agents from fluids (e.g., air or other gases, or liquids) passing through them are used in various applications.

For example, respirator masks, sometimes referred to as "gas masks", are used extensively in chemical, biological, radiological and nuclear (CBRN) defense and other applications (e.g., other military, industrial or police applications) to protect a wearer against inhalation of noxious agents (e.g., chemical agents, biological agents, radiological agents, and/or other poisonous or otherwise harmful agents that can cause disease, injury or death). These masks may also provide protection for the wearer's eyes and/or skin.

It is typically desirable to have a respirator mask which, besides protecting its wearer, will minimally affect comfort and/or performance of the wearer. For example, low respiratory resistance is important to avoid making it difficult for the wearer to properly breathe. Thus, proper filtration and low resistance to airflow are normally desirable, although they may often be conflicting requirements.

Similar considerations may arise in filters used for other filtration applications (e.g., biogas purification, gas storage and delivery, hydrogen production, mercury removal, drinking water treatment, effluent water treatment, swimming pool water treatment, food and beverage processing, industrial purification (e.g. color removal, protein and organic impurities removal), industrial catalysis, gold recovery, vehicle air purification systems, odor control, poison treatment, cigarette filters and filters for hot cells construction).

For these and other reasons, there is a need for improvements in filters for respirator masks and other filtration applications.

SUMMARY

According to various aspects of the invention, there is provided a filter for a respirator mask or other filtering applications, in which the filter comprises a filtering medium which may enhance performance of the filter, such as by providing enhanced filtration and/or lower resistance to airflow (e.g., lower respiratory resistance for a wearer of the respirator mask). The filtering medium may comprise active particles (e.g., activated carbon) that are derived from a polymeric precursor (e.g., polyvinylidene dichloride (PVDC)), impregnated with additives (e.g., metals and triethylenediamine (TEDA)), substantially uniform in size (e.g., monodispersed), and/or loose.

For example, according to an aspect of the invention, there is provided a filter comprising a filtering medium for filtering. The filtering medium comprises active particles that are derived from a polymeric precursor and loose.

According to another aspect of the invention, there is provided a filter comprising a filtering medium for filtering. The filtering medium comprises active particles that are derived from a polymeric precursor and substantially uniform in size.

According to another aspect of the invention, there is provided a filter comprising a filtering medium for filtering. The filtering medium comprises active particles that are derived from a polymeric precursor, loose, and substantially uniform in size.

According to further aspects of the disclosure, a protective mask may be provided including one or more of a lens configured to allow a user of the mask to see therethrough, a sealing portion configured to at least partially seal an inner volume of the mask from an ambient atmosphere, and/or a filter interface configured to removably attach a filter to the mask, such that an outside gas can travel through the filter and the filter interface into the inner volume of the mask. In embodiments, the filter may include a container, a first screen/mechanical filter disposed between an interior of the container and the outside gas, a second screen/mechanical filter disposed between the interior of the container and the inner volume of the mask, and/or a filtering medium disposed in the container. In embodiments, the filtering medium may include active particles that are loose, substantially uniform in size, and/or derived from a polymeric precursor.

In embodiments, the outside gas may be provided from at least one of an ambient atmosphere, a pressurized gas tank, or gas line.

In embodiments, the mask may be a CBRN mask.

In embodiments, the mask may include an exhaust valve that is configured to allow gas to escape from the inner volume of the mask without passing back through the filter.

According to further aspects of the disclosure, a filter configured for use with a protective mask may be provided including one or more of a container including an interface for removably securing the filter to the exterior of the protective mask, a first screen/mechanical filter disposed between an interior of the container and atmosphere, a second screen/mechanical filter disposed between an interior of the container and an inner volume of the protective mask, and/or a filtering medium disposed in the container. In embodiments, the filtering medium may include active particles that are loose, substantially uniform in size, and/or derived from a polymeric precursor.

In embodiments, the active particles may have a uniform particle size distribution, with the diameter D of 1.4 mm and length L between 1.3 and 1.4 mm.

In embodiments, the active particles may include metallic additives in weight percent of the metallic additives upon the total weight of the active particles greater than 5% (wt %).

In embodiments, the active particles may include copper in weight percent of the copper upon the total weight of the active particles greater than 5% (wt %).

In embodiments, the active particles may include zinc in weight percent of the zinc upon the total weight of the active particles greater 5% (wt %).

In embodiments, the active particles may include molybdenum in weight percent of the molybdenum upon the total weight of the active particles greater than 1% (wt %).

In embodiments, the active particles may include silver in weight percent of the silver upon the total weight of the active particles greater than 0.05% (wt %).

In embodiments, the active particles may organic additives in weight percent of the organic additives upon the total weight of the active particles greater than 1%.

In embodiments, at least one of the first screen and the second screen may be fines pads.

In embodiments, the breakthrough times of the activated particles may the minimum requirements specified in the ASZM-TEDA standard.

In embodiments, the polymeric precursor may include at least one of polyvinylidene chloride (PVDC), polyvinylidene fluoride (PVDF), a PVDC copolymer, or a PVDF copolymer.

In embodiments, a ratio of standard deviation of the active particles' dimensions compared to an average particle dimension may be less than 0.35.

In embodiments, all of the active particles may share a substantially uniform spherocylindrical, spherical, or cylindrical shape.

In embodiments, a ratio pressure drop AP/T of the pressure drop AP across the filtering medium over a thickness T of the filtering medium over which the pressure drop AP occurs may be less than 45 Pa/cm.

According to further aspects of the disclosure, processes for making a filter may include one or more of providing a container including a filter interface for removably securing the filter to the exterior of the protective mask, providing a first screen disposed between an interior of the container and a gas intake of the filter, providing a second screen disposed between an interior of the container and the filter interface, and/or disposing a filtering medium in the container. In embodiments, the filtering medium may include active particles that are loose, substantially uniform in size, and/or derived from a polymeric precursor. In embodiments, the filtering medium and/or the active particles disposed in the container may include various other of the features described herein.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

Figure 1:
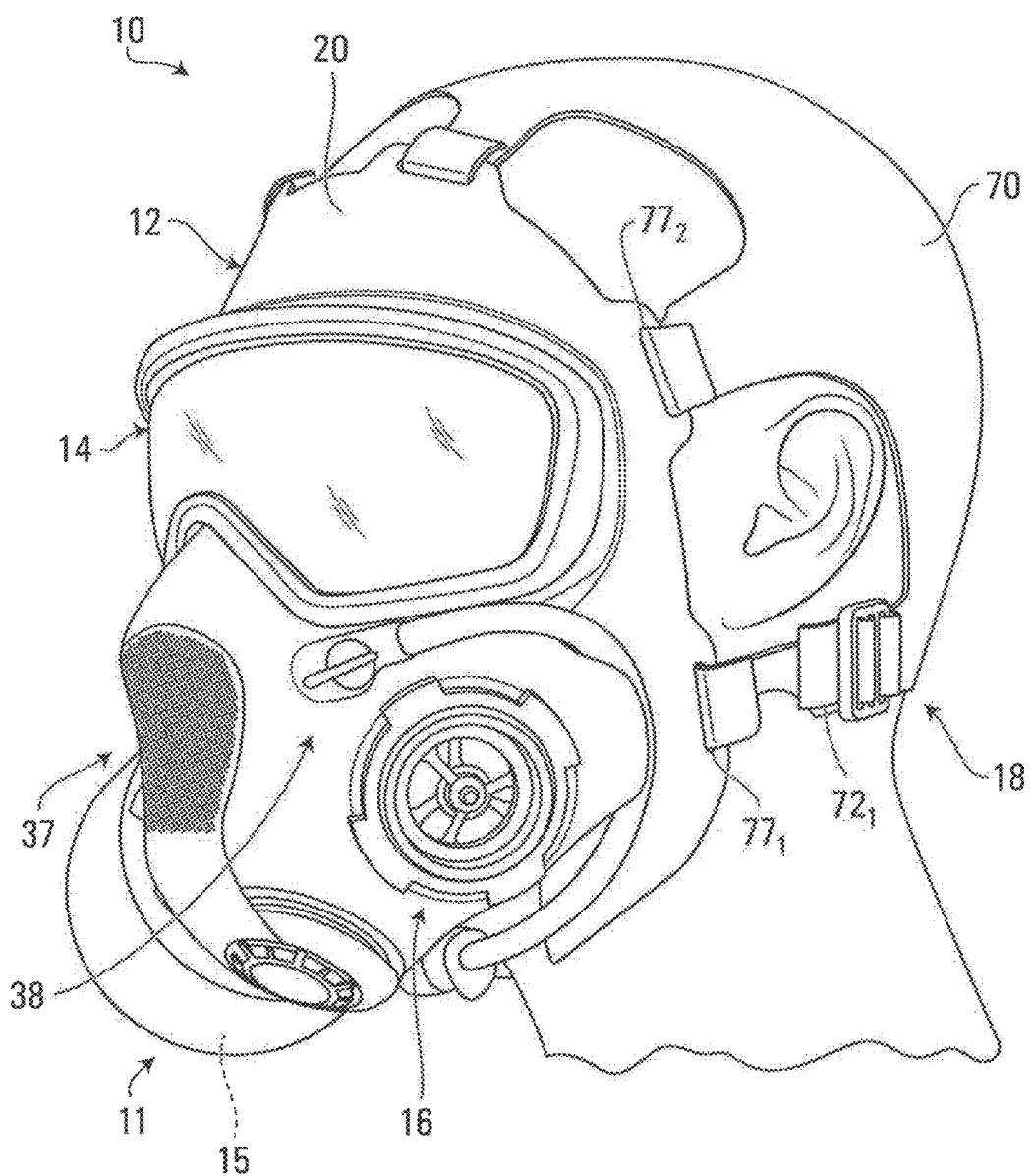
FIGS. 1 and 2 show an example of a respirator mask wearable by a wearer and comprising a filter for protecting the wearer against inhalation of noxious agents in accordance with an embodiment of the invention.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a lens" is a reference to one or more lenses and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

Figure 2:
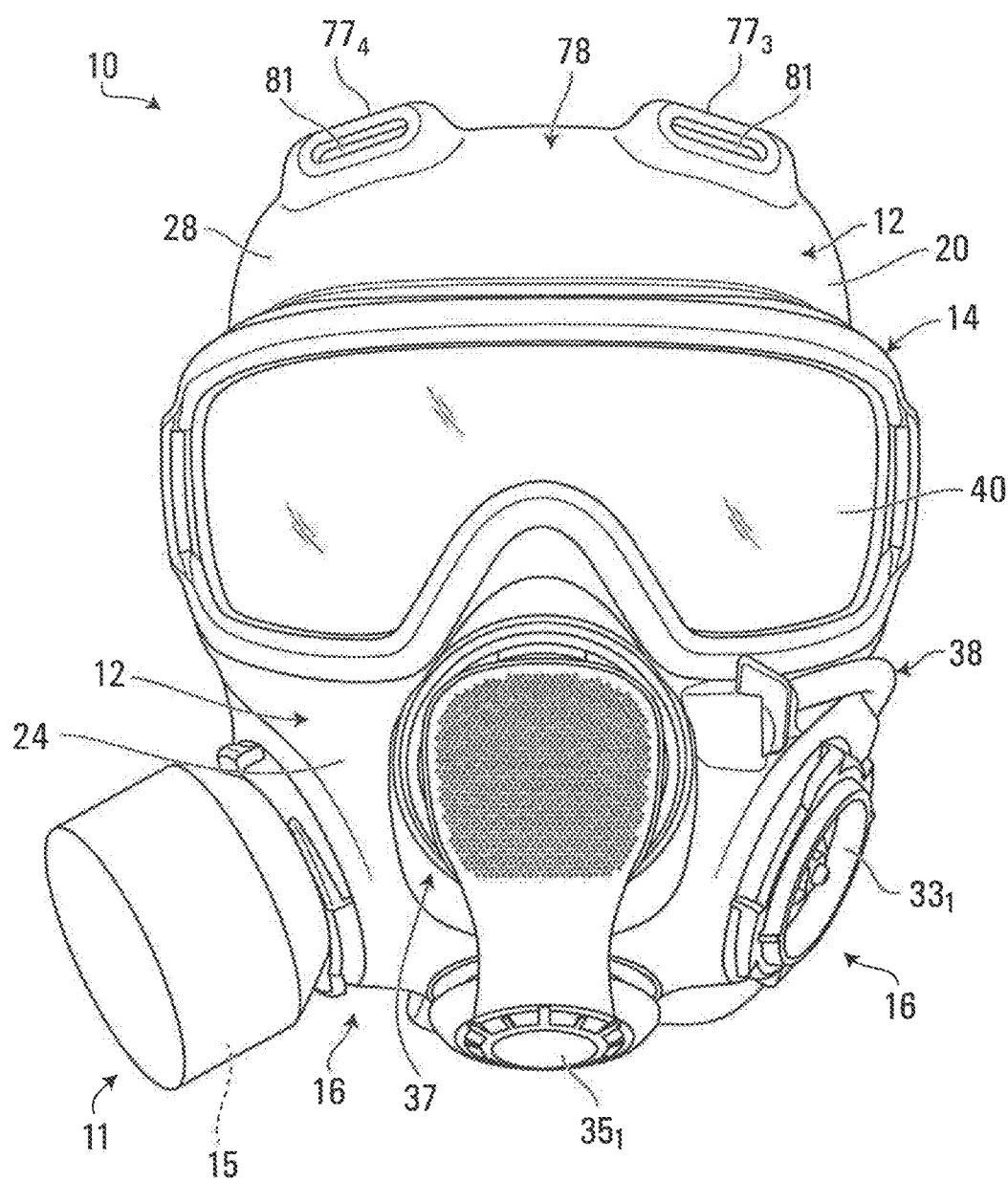

FIGS. 1 and 2 show an example of a filter 11 for removing noxious or otherwise undesirable agents from a fluid (e.g., air or another gas or gas mixture, or a liquid) passing through it in accordance with an embodiment of the invention. In this embodiment, the filter 11 is part of a respirator mask 10 wearable by a wearer for protecting the wearer against inhalation of noxious agents (e.g., chemical agents, biological agents, radiological agents, and/or other poisonous or otherwise harmful agents that can cause disease, injury or death). More particularly, in this embodiment, the mask 10 is a chemical, biological, radiological and nuclear (CBRN) respirator mask to protect the wearer who may be exposed to a chemical, biological, radiological or nuclear hazard.

The mask 10 comprises a facepiece 12 for covering at least part of the wearer's face, a visor/lens 14 for allowing the wearer to see, a breathing interface 16 connected to the filter 11 for allowing the wearer to breathe clean air, and a harness 18 for securing the mask 10 to the wearer's head. In this embodiment, the mask 10 also comprises a speech transmitter 37 to transmit the wearer's speech and a hydration interface 38 to provide potable water or other liquid to the wearer.

The filter 11 is configured to filter ambient air in the wearer's environment to remove noxious agents potentially contained therein so as to provide filtered (or "purified") air within the mask 10 for the wearer to breathe. For example, in this embodiment, the filter 11 provides protection against chemical substances (e.g., chemical weapon agents (CWA) and toxic industrial chemicals (TICs)) or other noxious agents.

As further discussed later, in this embodiment, the filter 11 comprises a filtering medium 15 which may enhance performance of the filter 11 and that of the mask 10, such as by providing enhanced filtration (e.g., against chemicals encountered in military or first responder applications, such as cyanogen chloride, hydrogen cyanide, dimethyl methylphosphonate, sulfur dioxide, and cyclohexane) and/or lower resistance to airflow (e.g. a lower pressure drop) and thus lower respiratory resistance for the wearer. Notably, the filtering medium 15 may comprise active particles (e.g., activated carbon) that are derived from a polymeric precursor (e.g., polyvinylidene dichloride (PVDC)), impregnated with additives (e.g., metals and triethylenediamine (TEDA)), substantially uniform in size (e.g., monodispersed), and/or loose.

The facepiece 12 overlies at least part of the wearer's face when the mask 10 is worn. Notably, the facepiece 12 extends over the wearer's face such that the mask 10 covers at least the wearer's nose and mouth. In this embodiment, the facepiece 12 also extends over the wearer's chin and forehead as well as lateral sides of the wearer's head. Thus, in this embodiment, the mask 10 may be referred to as a "full-face" mask. In other embodiments, the facepiece 12 may cover a different (e.g., smaller) extent of the wearer's face (e.g., the mask 10 may be a "half-face" mask).

Figure 3:
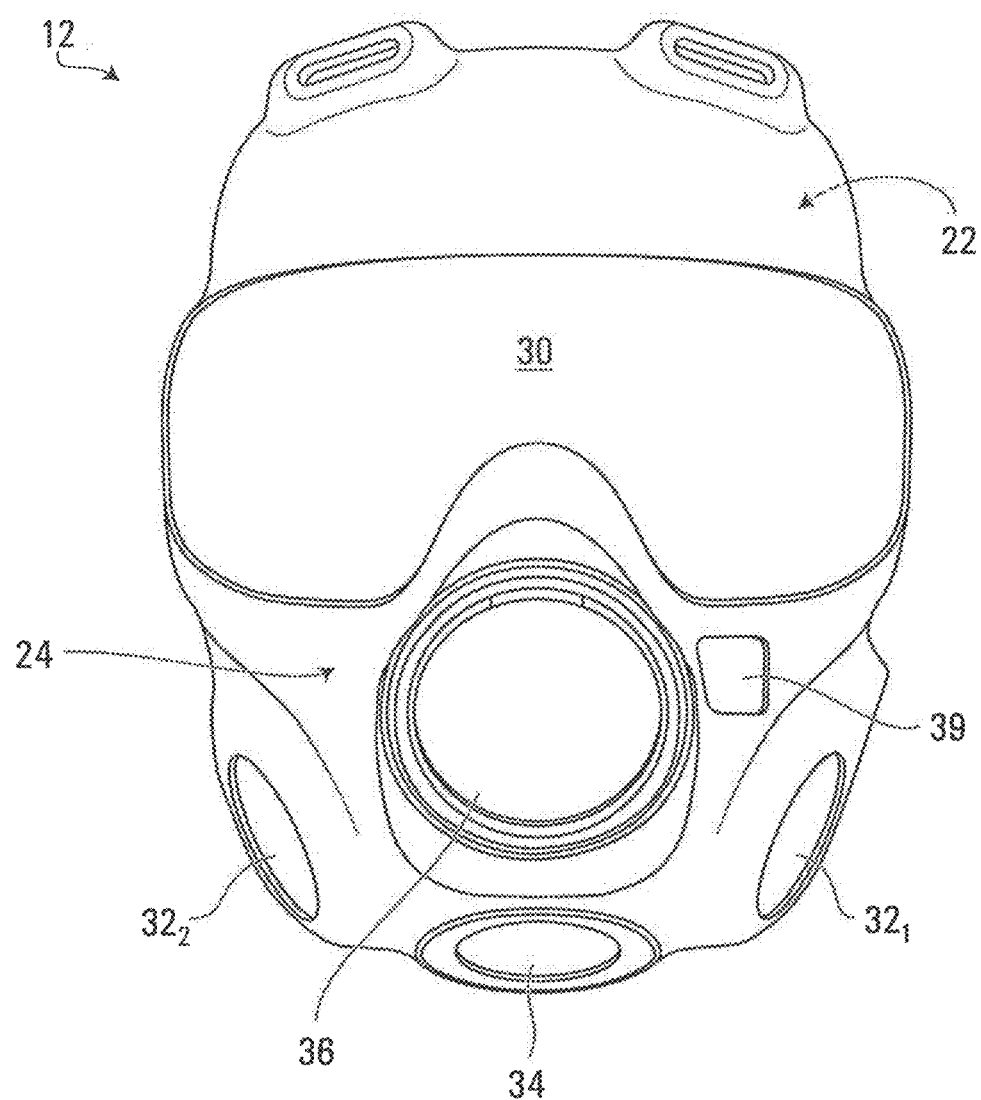
FIG. 3 shows a facepiece of the respirator mask.

More particularly, in this embodiment, with additional reference to FIG. 3, the facepiece 12 comprises a face-engaging portion 20 which engages the wearer's face. The face-engaging portion 20 extends substantially around a perimeter of the wearer's face and includes a sealing surface 22 which creates a seal against the wearer's face.

The facepiece 12 also comprises a support portion 24 supporting components of the mask 10 that are connected to the facepiece 12, including the visor 14, the breathing interface 16 connected to the filter 11, the speech transmitter 37, and the hydration interface 38. More specifically, in this embodiment, the support portion 24 comprises a plurality of openings for accommodating components of the mask 10, including an opening 30 for the visor 14, openings $32_1$, $32_2$ for inhalation ports $32_1$, $32_2$ of the breathing interface 16, an opening 34 for an exhalation port $35_1$ of the breathing interface 16, an opening 36 for the speech transmitter 37, and an opening 39 for the hydration interface 38.

In this embodiment, the facepiece 12 comprises a polymeric material 28 molded into a shape of at least part of the facepiece 12. More particularly, in this embodiment, the polymeric material 28 is an elastomeric material. The elastomeric material 28 may be any polymeric material with suitable elasticity. For instance, in various embodiments, the elastomeric material 28 may be a thermoplastic elastomer (e.g., a fluorinated thermoplastic elastomer or any other thermoplastic elastomer) or a thermoset elastomer (e.g., a fluorinated thermoset elastomer or any other thermoset elastomer). In this example of implementation, the elastomeric material 28 is a rubber material. More specifically, in this example, the rubber material 28 is a butyl rubber. Any other suitable rubber compound may be used in other examples (e.g., natural rubber, butadiene rubber, styrene butadiene rubber, halogenated butyl rubber, etc.). In this example of implementation, the rubber material 28 is molded into the shape of the facepiece 12 by an injection molding process.

The facepiece 12 may be made of any other suitable material and/or using any other suitable process in other embodiments. For example, in other embodiments, the elastomeric material 28 may be another elastomer instead of rubber (e.g., a polyurethane elastomer, an ethylene elastomer, a propylene elastomer, a nitrile elastomer, an epichlorohydrin elastomer, a polychloroprene elastomer, an ethylene acrylic elastomer, a tetrafluoroethylene elastomer, a tetrafluoropropylene elastomer, a fluoroelastomer, a perfluoroelastomer, etc.). In yet other embodiments, the facepiece 12 may include a polymeric non-elastomeric material or any other suitable polymeric material (e.g., polyethylene, polyamide, polypropylene, polyvinyl chloride, chlorosulphonated polyethylene, chlorinated polyethylene, polyacrylate, polysulfide, silicone, fluorosilicone, etc.). As another example, in other embodiments, the facepiece 12 may be molded into shape by a compression molding process or any other suitable molding process.

The lens 40 may be shaped, constructed of any suitable materials, and/or otherwise configured in any other suitable manner in other embodiments (e.g. an aspheric design or any other suitable design, no recess, etc.).

The breathing interface 16 is configured to allow the wearer to breathe safely, despite noxious agents that may be present in the wearer's environment. To that end, in this embodiment, the breathing interface 16 is connectable to the filter 11, which is configured to provide clean air for the wearer to breathe, i.e., air that is substantially free of noxious agents that may be present in the wearer's environment.

Figure 4:
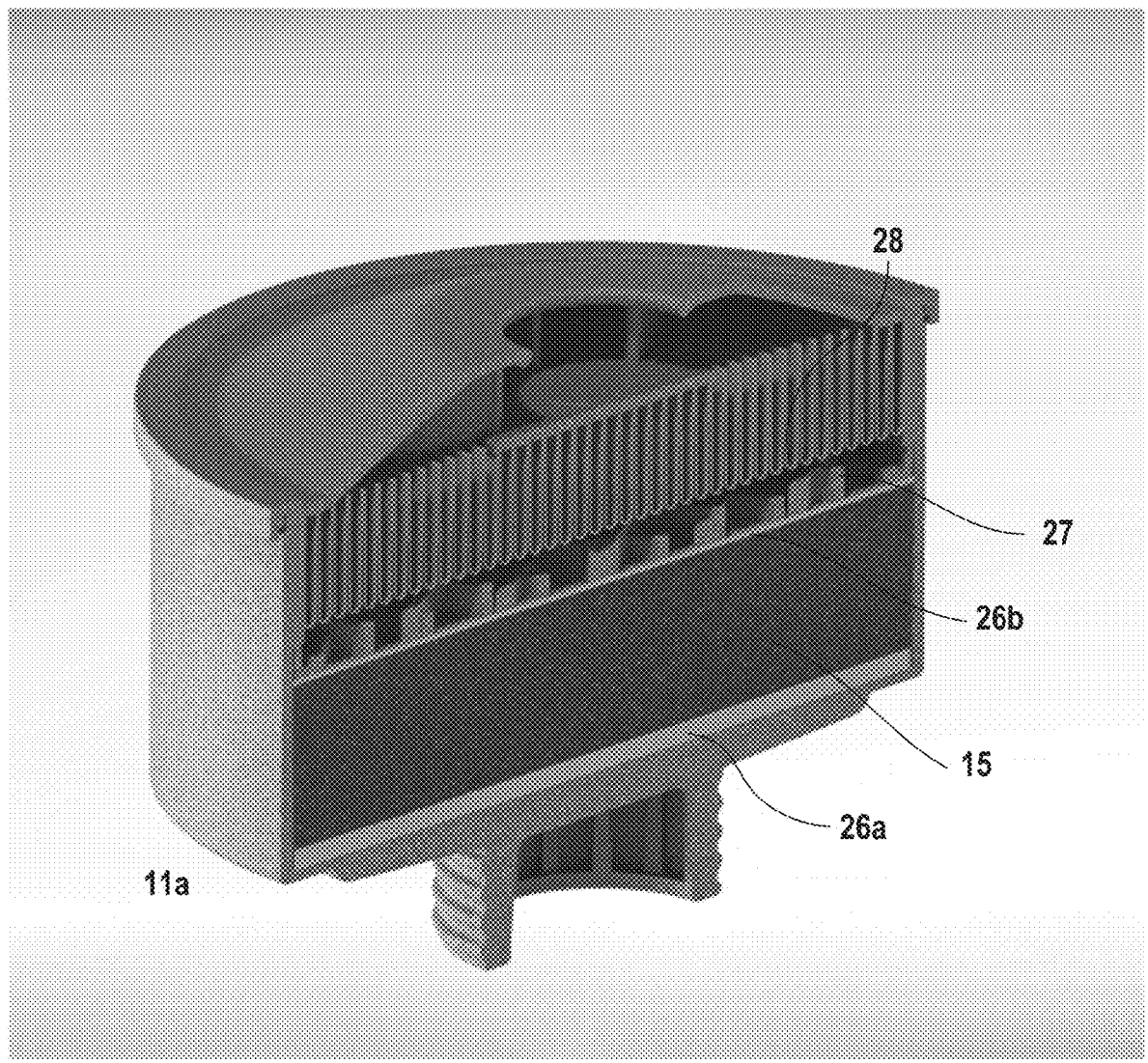
FIG. 4 shows an exemplary mask filter.

FIG. 4 shows additional details of a removable mask filter 11a, which may include a similar filtering medium 15 between fines pads 26a and 26b. The filter 11a may also include an upper retainer assembly 27 fabricated from a plastic, such as Noryl GFN1, or other material, and/or an aerosol filter medium 28. Any of the fines pads 26a and 26b and/or aerosol filter medium 28 may be configured as a physical filter to remove, for example, dust or other contaminants from the air, as well as maintain the filtering medium 15 in a serviceable condition.

Figure 5A:
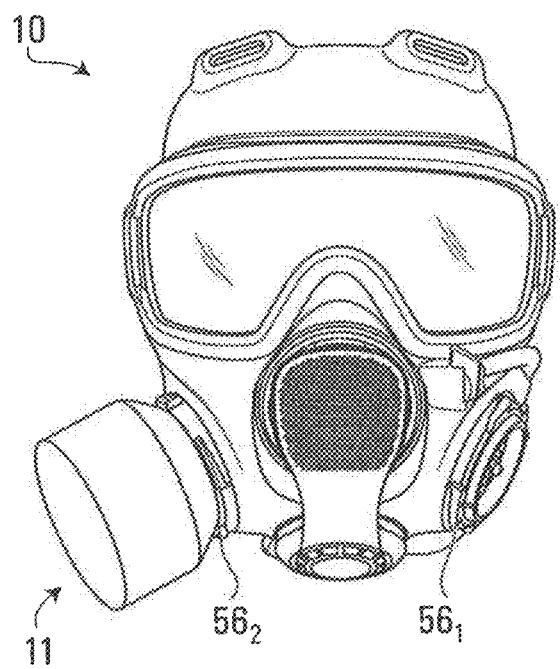
FIGS. 5A and 5B show a filter and optionally another similar filter mounted to the respirator mask, respectively.
Figure 5B:
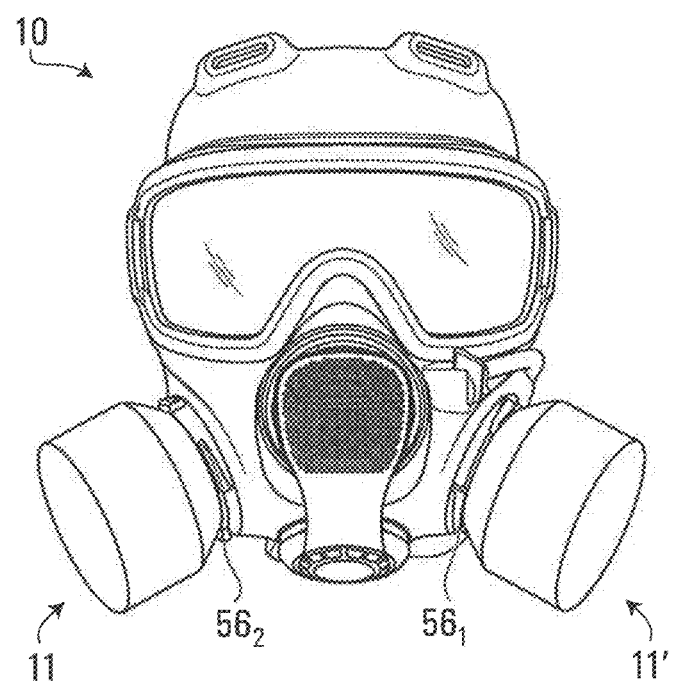

Turning to FIGS. 5A and 5B, the breathing interface 16 may include a plurality of mounts $56_1$, $56_2$ for mounting the filter 11 to the mask 10. The mounts $56_1$, $56_2$ can thus be referred to as "filter mounts" in this case. In this example, the filter mounts $56_1$, $56_2$ are disposed on respective sides of the mask 10. Specifically, in this example, the filter mounts $56_1$, $56_2$ provide the inhalation ports $33_1$, $33_2$ of the breathing interface 16 located in the openings $32_1$, $32_2$ of the facepiece 12. This can allow the filter 11 to be mounted on either side of the mask 10, for instance, according to the wearer's preference or task at hand. Also, in some cases, as shown in FIGS. 5A and 5B, the filter 11 can be mounted to a given one of the filter mounts $56_1$, $56_2$ while a similar filter 11' can be mounted to the other one of the filter mounts $56_1$, $56_2$. This can provide more filtering capacity or longer use of the mask 10.

In this embodiment, each filter mount $56x$ comprises a valve 65 (e.g., a check valve) to regulate airflow within the mask 10, including air flowing into the mask 10 for breathing by the wearer. The valve 65 is operable in an open state allowing flow of air through the valve 65 for the wearer to inhale and in a closed state preventing flow of air through the valve 65. The valve 65, including its structure and operation, will be discussed further below.

Figure 6A:
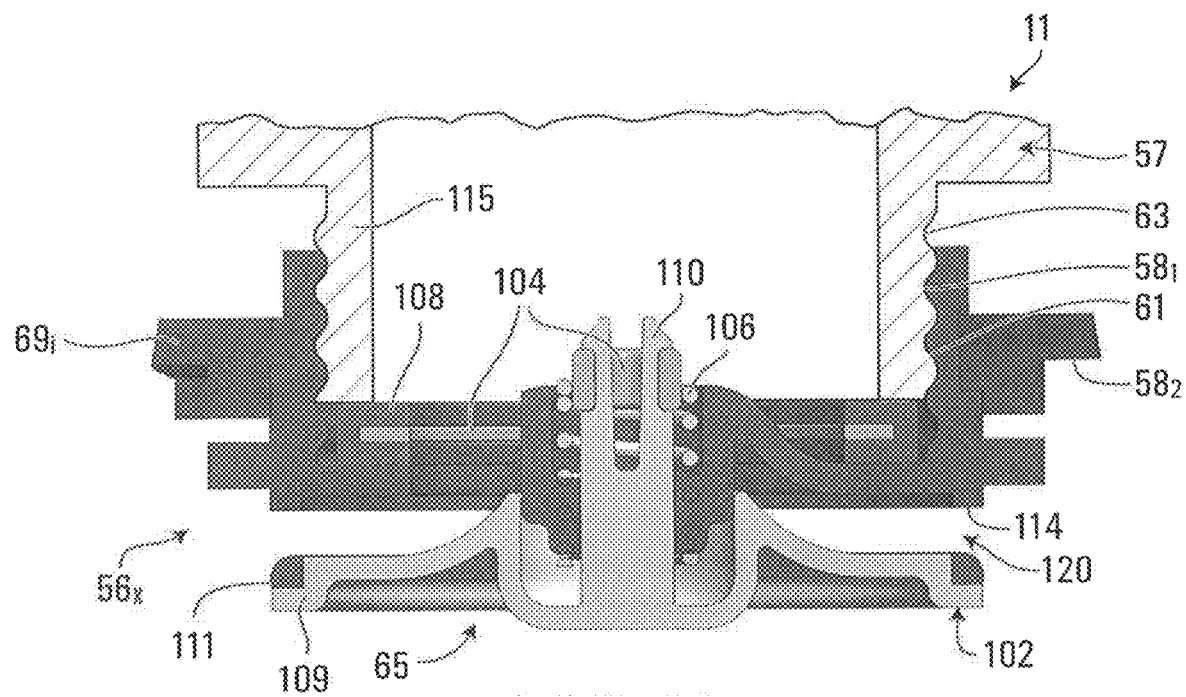
FIGS. 6A, 6B and 7 show a mount of a breathing interface of the respirator mask and different types of configurations of the filter mounted to the mount.
Figure 6B:
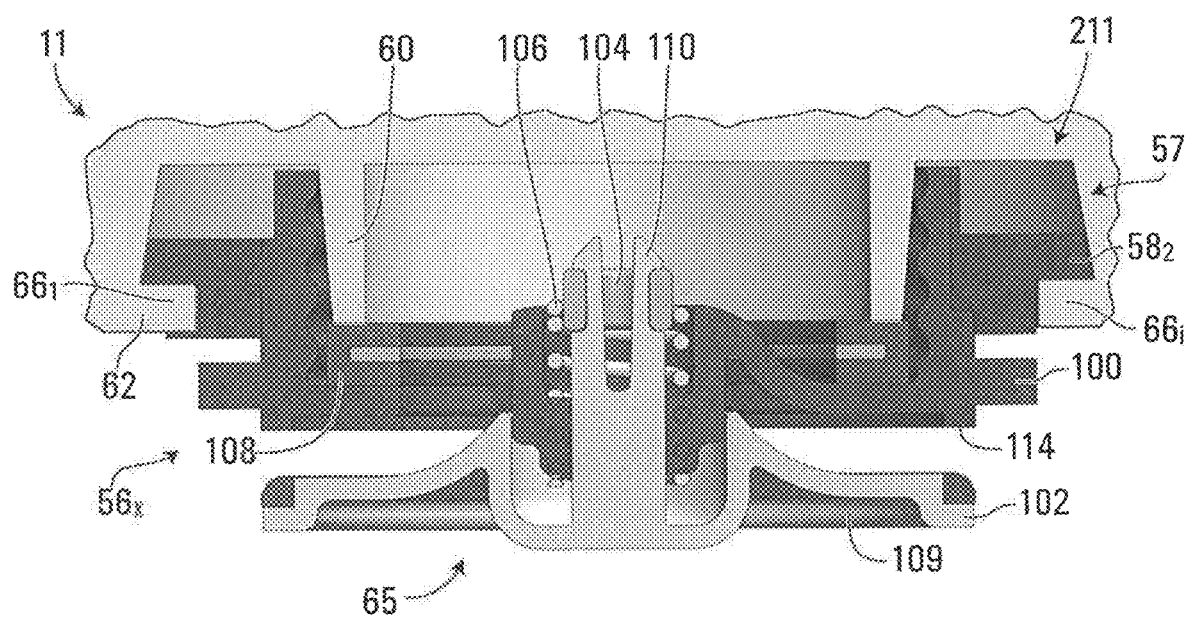

As shown in FIGS. 6A and 6B, in this embodiment, the filter mount $56x$ is connectable to a plurality of different types of filters, such that the filter 11 may have different configurations. For example, as shown in FIGS. 6A and 6B, the filter 11 comprises a connector 57 for connecting the filter 11 to the filter mount 56x and the connector 57 may have different configurations. To that end, in this embodiment, the filter mount 56x comprises a plurality of connectors 581, 582 that are different from one another to connect respective ones of the different configurations of the connector 57 of the filter 11. When any one of the different configurations of the connector 57 of the filters 11 is connected to a corresponding one of the connectors 581, 582 of the filter mount 56x, it interacts with the filter mount 56x so as to operate the valve 65.

More particularly, in some embodiments, the filter 11 may be a threaded filter which is securable to the filter mount 56x by being screwed into the filter mount 56x. The connector 57 of the filter 11 comprises a thread 63. The connector 581 of the filter mount 56x is thus a threaded connector including a thread 61 that is complementary to the thread 63 of the filter 11. In this example, the thread 63 of the filter 11 is a standard NATO thread (e.g., a 40-mm NATO thread). Any other suitable thread may be used in other examples.

Also, in some embodiments, the filter 11 may be a threadless filter which is securable to the filter mount 56x without being screwed into the filter mount 56x, By "threadless", it is meant that the filter 211 does not have a thread required to retain the filter 211 on the mask 10. Rather, in this embodiment, the filter 211 is a "quick-connect" filter. More particularly, in this embodiment, the filter 211 is connectable to the filter mount 56x by being pushed into the filter mount 56x and subsequently secured thereto.

More specifically, in this embodiment, the connector 57 of the filter 211 comprises an inner valve-engaging rim 60 for engaging the valve 65 of the filter mount 56x and an outer securing rim 62 for engaging the connector 582 of the filter mount 56x. The securing rim 62 is circular and has a diameter greater than a diameter of the connector 582. In addition, the securing rim 62 comprises interlocking elements $66_1$-$66i$ for meshing with the connector 582 of the filter mount 56x.

Thus, in use, the wearer of the mask 10 (or another individual) wishing to mount the filter 11 to the filter mount 56x first aligns the interlocking elements $66_1$-$66i$ of the securing rim 62 with the connector 582 such that the interlocking elements $69_1$-$69i$ of the connector 582 do not interfere with an inward movement of the securing rim 62. The filter 11 is then pushed inwardly towards the mask 10. Upon actuating the valve 65 by engagement of its valve-engaging rim 60 with the valve 65, the filter 11 is then turned (e.g., in a clockwise direction) such that the interlocking elements $66_1$-$66i$ of the securing rim 62 slideably mesh with the interlocking elements $69_1$-$69i$ of the connector 582. This turn of the filter 11 is less than a complete rotation (i.e., less than 360°), which makes for a quick connection, in contrast to a screwing action requiring multiple full rotations. For instance, in some embodiments, a turn of less than 180°, in some cases less than 120°, in some cases less than 90° may be used to secure the filter 11 to the filter mount 56x (e.g., a one-eighth turn, a quarter turn, or a half-turn). The abutment 75 of each of the interlocking elements $69_1$-$69i$ then stops the sliding motion of the interlocking elements $66_1$-$66j$. At this point, the filter 11 is safely secured to the filter mount 56x and able to provide filtered air into the mask 10 for the wearer to breathe.

Figure 7:
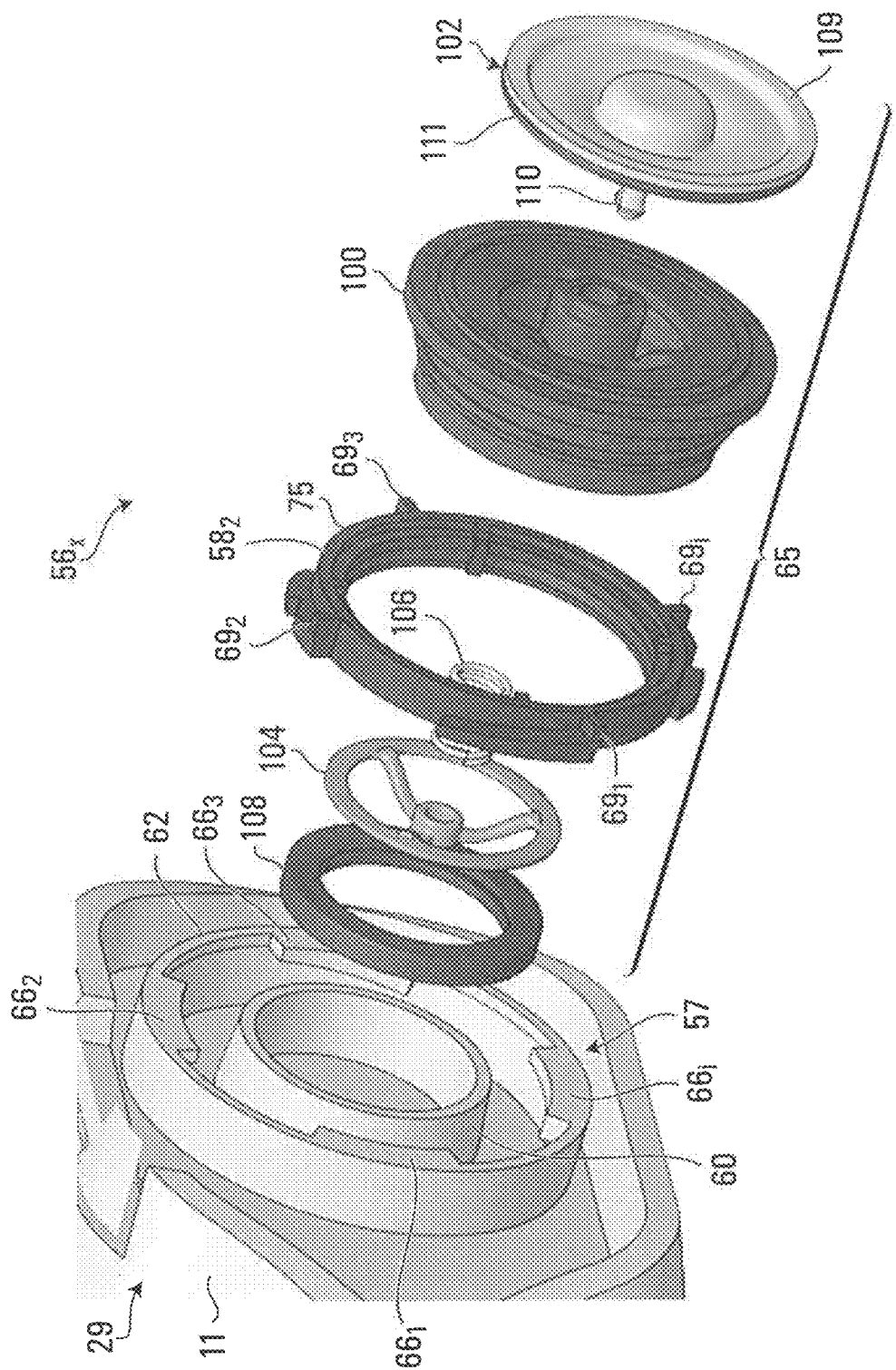

Referring to FIGS. 6A, 6B and 7, the valve 65 regulates airflow within the mask 10, including air flowing into the mask 10 for breathing by the wearer. More particularly, in this embodiment, the valve 65 is mounted within a frame 100 of the filter mount 56x. The frame 100 defines a passage for air to flow into the mask 10. In addition, the frame 100 includes the connector 581 in its interior peripheral wall and securely receives the connector 582 on its outer peripheral wall. Also, the frame 100 defines an opening 112 in a central position of the frame 100, and a sealing surface 114 at its bottom.

In this embodiment, the valve 65 comprises a movable closure 102, a support 104, a biasing member 106, and a seal 108. In this example, the movable closure 102 comprises: a base 109 operable to block the passage of air through the frame 100; a projection (e.g., a stem) 110 protruding from the base 109; and a sealing element 111 fixed on an upper surface of the base 109. In this case, the base 109 is disc-shaped. In other cases, the base 109 may have any other shape. The projection 110 is inserted into the opening 112 of the frame 100. The biasing member 106 is positioned around the projection 110, in a pocket of the frame 100. The support 104 is fixedly mounted onto an upper portion of the projection 110 and has a bottom surface abutting the biasing member 106 such that the biasing member 106 is compressed between the support 104 and the frame 100. Because the biasing member 106 is in compression, the support 104 and consequently the movable closure 102 are urged upwardly such that the sealing element 111 of the movable closure 102 is pressed against the sealing surface 114 of the frame 100. Furthermore, the seal 108 fixedly envelops the support member 104 such as to cover a peripheral surface, the top surface and the bottom surface of the support member 104.

In this example of implementation, the biasing member 106 is a spring, i.e., a resilient object that is deformable (i.e., changeable in configuration) such that it changes in configuration under load and recovers its initial configuration when the load is removed. More particularly, in this embodiment, the biasing member 106 is a coil spring (e.g., a metallic or polymeric coil spring). The biasing member 106 may be any other suitable type of spring in other embodiments. For example, in some embodiments, the biasing member 106 may be a leaf spring, an elastomeric spring (e.g., a rubber spring), a fluid spring (i.e., a spring including a liquid or gas contained in a container such as a cylinder or a bellows and variably compressed) such as a gas spring. Thus, deformation (i.e., change in configuration) of the biasing member 106 may be achieved in various ways in other embodiments.

In this embodiment, the valve 65 remains open while the filter 11 is connected to the filter mount 56x. This lowers respiratory resistance compared to conventional masks in which valves repeatedly open and close as wearers inhale and exhale.

Also, in this embodiment, the valve 65 automatically closes when the filter 11 is disconnected from the filter mount 56x. The valve 65 is thus a normally-closed valve such that its "normal" state is the closed state. This helps to seal the mask 10 against ingress of noxious agents through the filter mount 56x.

Interactions between the filter 11 and the filter mount 56x which allow the valve 65 to acquire one of its open and closed states in this embodiment will now be further described.

In embodiments where it is threaded, as shown in FIG. 6A, the filter 11 comprises a valve-engaging rim 115 for engaging the valve 65 as well as the connector 581 of the filter mount 56x. More specifically, in this example, the thread 63 of the filter 11 is provided on an outer peripheral surface of the valve-engaging rim 115. The thread 63 of the valve-engaging rim 115 is configured for engaging the matching thread 61 of the connector 58₁ such that the valve-engaging rim 115 may be screwed into the connector 58₁. This screwing action eventually leads to the valve-engaging rim 115 contacting the seal 108, after which further screwing causes the valve-engaging rim 115 to drive the seal 108, the support 104 and the movable closure 102 of the valve 65 inwards while the biasing member 106 is compressed. Consequently, a gap 120 opens between the movable closure 102 and the sealing surface 114 of the frame 100, thus allowing entry of air into the mask 10. Once the valve-engaging rim 115 has driven the support 104 to its bottom position within the frame 100, as illustrated in FIG. 6A, the gap 120 is at its greatest size and the filter 11 is fully locked into the filter mount 56x. At this point, the valve 65 is in its open state and remains open until the wearer of the mask 10 disengages the filter 11 from the filter mount 56x.

Conversely, to disengage the filter 11 from the filter mount 56x, the valve-engaging rim 115 is unscrewed from the connector 58₂. As the valve-engaging rim 115 is unscrewed, the force exerted by the biasing member 106 on the bottom surface of the support 104 causes the support 104 and the movable closure 102 to be displaced upwardly. This in turn causes the gap 120 to reduce in size. Once the valve-engaging rim 115 has been sufficiently unscrewed from the connector 58₂, the sealing element 111 of the movable closure 102 presses against the sealing surface 114 of the frame 100 such that the gap 120 is closed off (i.e., becomes substantially non-existent). The filter 11 is thus dismounted from the filter mount 56x and the valve 65 is in its closed state.

In embodiment where it is threadless, as shown in FIG. 6B, in order to mount the filter 11 to the filter mount 56x, the filter 11 is pushed into the filter mount 56x. If the interlocking elements $66_1$-$66i$ of the securing rim 62 press against the interlocking elements $69_1$-$69i$ of the connector 58₂ and thus prevent pushing the filter 11 inwardly, a simple rotation of the filter 11 allows to correctly engage the connector 58₂. If properly aligned, pushing the filter 11 into the filter mount 56x causes the inner valve-engaging rim 60 of the filter 11 to inwardly push the seal 108 of the valve 65. In turn, this causes the support 104 and the movable closure 102 to be driven inwardly. Consequently, the gap 120 is opened between the movable closure 102 and the sealing surface 114 of the frame 100. Once the inner valve-engaging rim 60 has driven the support 104 to its bottom position within the frame 100, as illustrated in FIG. 6B, the gap 120 is at its greatest size. At this point, the filter 11 is turned (e.g., in a clockwise direction) in order for the interlocking elements $66_1$-$66i$ to slideably mesh with the interlocking elements $69_1$-$69i$ of the connector 58₂. The abutments 75 of the interlocking elements $69_1$-$69i$ stop the wearer from further rotating the filter 11. At this point, the filter 11 is secured to the filter mount 56x and the valve 65 is in its open state. The valve 65 remains in its open state until the filter 11 is disengaged from the filter mount 56x.

In order to dismount the filter 11 from the filter mount 56x, the filter 11 is turned in an opposite direction (e.g., a counterclockwise direction) to cause the interlocking elements $66_1$-$66i$ to disengage from the interlocking elements $69_1$-$69j$. The filter 11 is then pulled outwardly from the filter mount 56x. As the filter 11 is pulled away, the force exerted by the biasing member 106 on the bottom surface of the support 104 causes the support 104 and the movable closure 102 to be displaced upwardly. This in turn causes the gap 120 to reduce in size. Once the inner rim 60 of the filter 11 is no longer in contact with the valve 65, the sealing element 111 of the movable closure 102 presses against the sealing surface 114 of the frame 100 such that the gap 120 is closed off. The filter 11 is thus dismounted from the filter mount 56x and the valve 65 is in its closed state.

The filter mount 56x may be implemented (e.g., shaped, constructed, etc.) in various other ways in other embodiments.

Figure 8:
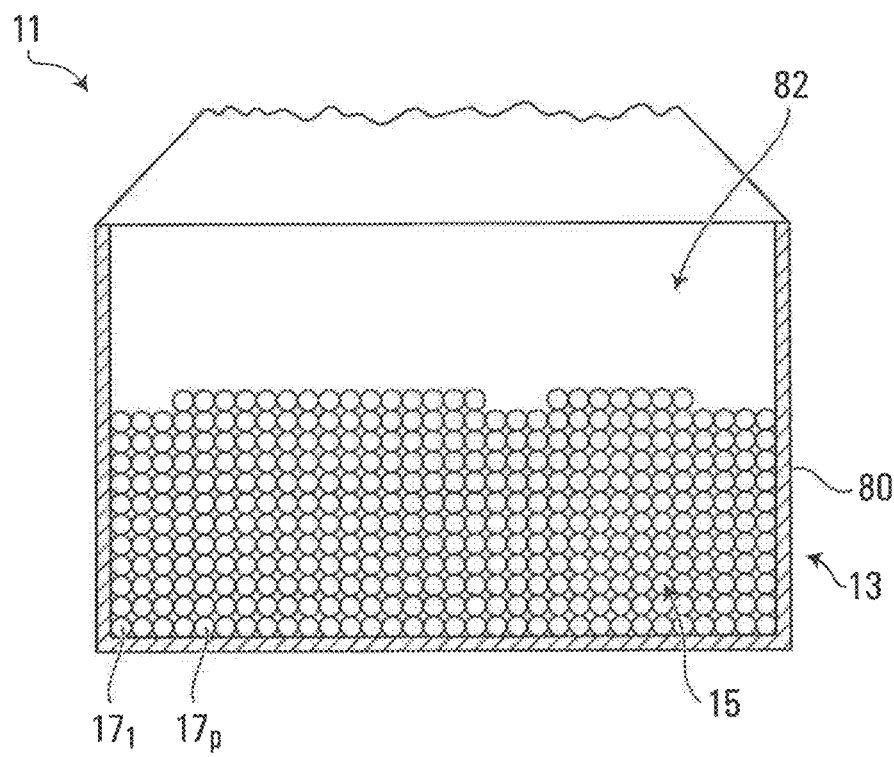
FIG. 8 shows a cross-sectional side elevation view of the filter comprising a filtering medium and a container.

The filter 11 comprises the filtering medium 15 to filter ambient air in the wearer's environment to remove noxious agents (e.g., chemical weapon agents (CWA), toxic industrial chemicals (TICs), or other noxious agents) that may be contained therein so as to provide filtered air within the mask 10 for the wearer to breathe. In this embodiment, and with further reference to FIG. 8, the filter 11 comprises a container 13 that contains the filtering medium 15. In this example, the container 13 also allows the filter 11 to be mounted to the filter mount 56x.

The filtering medium 15 comprises active particles $17_1$-$17_p$ for filtering noxious agents exposed to the filtering medium 15. The active particles $17_1$-$17_p$ are "active" in that they have a property allowing them to induce a chemical and/or physical reaction in response to a stimulus at their surface which filters noxious agents.

Figure 9:
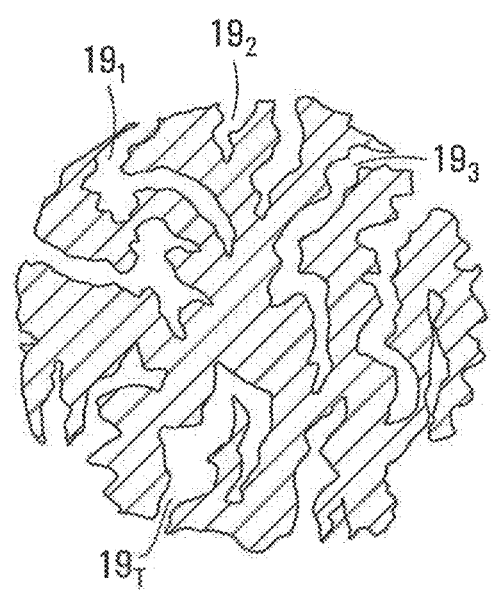
FIG. 9 shows a cross-sectional view of an example of an active particle of the filtering medium.

For example, in this embodiment, the active particles $17_1$-$17_p$ have an adsorptive property that causes them to adsorb contaminants or other noxious agents. More particularly, in this embodiment, and with further reference to FIG. 9, the active particles $17_1$-$17_p$ are porous particles each including a multitude of pores $19_1$-$19_T$ (e.g., several thousands of pores) which can trap the contaminants or other noxious agents.

Because of their pores $19_1$-$19_T$, the active particles $17_1$-$17_p$ have a surface area which is very large. For example, in some embodiments, the surface area of the active particles $17_1$-$17_p$ may be at least 200 m² per gram of active particle, in some cases at least 400 m² per gram of active particle, in some cases at least 600 m² per gram of active particle, in some cases at least 800 m² per gram of active particle, in some cases at least 1000 m² per gram of active particle, in some cases at least 1200 m² per gram of active particle, in some cases at least 1400 m² per gram of active particle, in some cases at least 1600 m² per gram of active particle, in some cases at least 1800 m² per gram of active particle, in some cases at least 2000 m² per gram of active particle and in some cases even more. The surface area of the active particles $17_1$-$17_p$ may have any other suitable value in other embodiments.

In some cases, respective ones of the active particles $17_1$-$17_p$ may be characterized as "macroporous", that is, at least a fraction of their pores $19_1$-$19r$ have a diameter that is greater than 10 microns. A "macropore", as used herein, means a macroscopic pore. In some cases, the active particles $17_1$-$17_p$ may be characterized as "highly microporous", that is, at least a fraction of their pores $19_1$-$19_T$ have a diameter that is less than 10 microns. A "micropore", as used herein, means a microscopic pore.

In some embodiments, the active particles $17_1$-$17_p$ may be at least mainly (i.e., mainly or entirely) microporous. That is, at least a majority (i.e., a majority or an entirety) of the pores $19_1$-$19_T$ of the active particles $17_1$-$17_p$ may be micropores. For example, in some embodiments, at least 60%, in some cases at least 70%, in some cases at least 80%, in some cases at least 90%, in some cases at least 95% and in some cases even more of the pores $19_1$-$19_T$ of the active particles $17_1$-$17_p$ may be micropores.

The active particles $17_1$-$17_p$ are granules of active material. In this embodiment, the granules $17_1$-$17_p$ are particles of a controlled shape, as further discussed below. More particularly, in this embodiment, the active particles $17_1$-$17_p$ are pellets, i.e., rounded, spherical or cylindrical particles. For instance, in this embodiment, the active particles $17_1$-$17_p$ are spherocylindrical particles. In other embodiments, the active particles $17_1$-$17_p$ may have any other suitable shape.

In this embodiment, the active particles $17_1$-$17_p$ are particles of activated carbon. More particularly, in this embodiment, and with additional reference to FIG. 10, the particles of activated carbon $17_1$-$17_p$ are derived from a polymeric precursor 90. The polymeric precursor 90 is a polymeric material from which the particles of activated carbon $17_1$-$17_p$ are produced. This is in contrast to some conventional sources of activated carbon such as nutshells, coconut husk, coal-based materials, etc., that may result in poor reproducibility (e.g., in size) and/or porosity control, which may affect performance.

The polymeric precursor 90 is a synthetic polymeric material. In this embodiment, the polymeric precursor 90 comprises polyvinylidene chloride (PVDC). In other embodiments, the polymeric precursor 90 may comprise polyvinylidene fluoride (PVDF), a PVDC copolymer, a PVDF copolymer, or any other suitable polymer or copolymer.

In this embodiment, the active particles $17_1$-$17_p$ derived from the polymeric precursor 90 are reproducibly produced in terms of size. That is, a size of each active particle $17i$ does not vary significantly for at least a bulk (i.e., a bulk or an entirety) of the active particles $17_1$-$17_p$, as further discussed below.

In this embodiment, the spherocylindrical active particles $17_1$-$17_p$ of activated carbon derived from the polymeric precursor 90 are substantially free of dust.

In this embodiment, the active particles $17_1$-$17_p$ comprise additives $21_1$-$21_A$, $23_1$-$23_B$ impregnated into their pores $19_1$-$19_T$ and/or onto their surface. The additives $21_1$-$21_A$, $23_1$-$23_B$ are additives that are added to the active particles $17_1$-$17_p$ derived from the polymeric precursor 90. This may help to further enhance filtration of the noxious agents by the filtering medium 15.

More particularly, in this embodiment, the additives $21_1$-$21_A$ are inorganic additives such as metallic additives. For instance, in some embodiments, the metallic additives $21_1$-$21_A$ may include copper, zinc, molybdenum and silver as found in commercially-available ASZM-TEDA impregnated activated carbon from CalgonCarbon Corp. Molybdenum may help to filter noxious agents such cyanogen chloride and hydrogen cyanide when used in combination with copper. Copper may help to filter a wide variety of noxious agents such as hydrogen cyanide, hydrogen sulfide and the likes. Zinc may help to filter noxious agents such as hydrogen cyanide, cyanogen chloride and ammonia. Silver may help to filter noxious agents such as arsenical gases. In other embodiments, the metallic additives $21_1$-$21_A$ may include any transition metal, such as, for example, copper, zinc, molybdenum, silver, nickel, vanadium, tungsten, yttrium, cobalt, iron, combinations thereof and the like. Since chromium has been identified as a potential carcinogen, the metallic additives may do not include chromium. Each transition metal may provide some protection, i.e. filtering capacity, against, a specific noxious or otherwise undesirable agent. The selection of which one or more transition metals to impregnate into the pores $19_1$-$19_T$ and/or onto the surface of the active particles $17_1$-$17_p$ may accordingly depend upon the desired range of filtering capabilities.

In this embodiment, the metallic additives $21_1$-$21_A$ occur as metals oxides impregnated into the pores $19_1$-$19_T$ and/or onto the surface of the active particles $17_1$-$17_p$. In other embodiments, the metallic additives $21_1$-$21_A$ may occur as salts of metals, carbonates of metals or under any other appropriate form.

In this embodiment, the metallic additives are located evenly into the pores $19_1$-$19_T$ and/or onto the surface of the active particles $17_1$-$17_p$. Specifically, in this embodiment, the fraction of metallic impregnant located into the pores $19_1$-$19_R$ of the active particles $17_1$-$17_p$ is 40%, in some cases 45%, in some cases 50%, in some cases 55% and in some cases 60%.

In some embodiments, the active particles $17_1$-$17_p$ may comprise in weight percent of the metallic additives $21_1$-$21_A$ upon a total weight of the active particles $17_1$-$17_p$ (wt/wt) at least 5%, in some cases at least 6%, in some cases at least 7%, in some cases at least 8%, in some cases at least 9%, in some cases at least 10% and in some cases even more. For example, in some embodiments, the active particles $17_1$-$17p$ may comprise in weight percent of the metallic additives $21_1$-$21_A$ upon the total weight of the active particles $17_1$-$17_p$ (wt/wt) between 8% and 13%, in some cases between 9% and 12% and in some cases between 10% and 11%.

In some embodiments, the active particles $17_1$-$17_p$ may comprise in weight percent of copper from the metallic additives $21_1$-$21_A$ upon the total weight of the active particles $17_1$-$17_p$ (wt/wt) at least 0.05%, in some cases at least 0.1%, in some cases at least 1%, in some cases at least 5%, in some cases at least 10%, in some cases at least 15% and in some cases even more. For example, in some embodiments, the active particles $17_1$-$17_p$ may comprise in weight percent of copper upon the total weight of the active particles $17_1$-$17_p$ (wt/wt) between 0.05% and 20%, in some cases between 1% and 15%, and in some cases between 5% and 10%.

In some embodiments, the active particles $17_1$-$17_p$ may comprise in weight percent of zinc from the metallic additives $21_1$-$21_A$ upon the total weight of the active particles $17_1$-$17_p$ (wt/wt) at least 0.5%, in some cases at least 1%, in some cases at least 5%, in some cases at least 10%, in some cases at least 15%, in some cases at least 20% and in some cases even more. For example, in some embodiments, the active particles $17_1$-$17_p$ may comprise in weight percent of zinc upon the total weight of the active particles $17_1$-$17_p$ (wt/wt) between 0.5% and 25%, in some cases between 1% and 20% and in some cases between 5% and 15%.

In some embodiments, the active particles $17_1$-$17_p$ may comprise in weight percent of molybdenum upon the total weight of the active particles $17_1$-$17_p$ (wt/wt) at least 0.1%, in some cases at least 1%, in some cases at least 5%, in some cases at least 10% and in some cases even more. For example, in some embodiments, the active particles $17_1$-$17_p$ may comprise in weight percent of molybdenum upon the total weight of the active particles $17_1$-$17_p$ (wt/wt) between 0.1% and 15% and in some cases between 1 and 10%.

In some embodiments, the active particles $17_1$-$17_p$ may comprise in weight percent of silver upon the total weight of the active particles $17_1$-$17_p$ (wt/wt) at least 0.01%, in some cases at least 0.05%, in some cases at least 0.1%, in some cases at least 0.5%, in some cases at least 1%, in some cases at least 5%, in some cases at least 10% and in some cases even more. For example, in some embodiments, the active particles $17_1$-$17_p$ may comprise in weight percent of silver upon the total weight of the active particles $17_1$-$17_p$ (wt/wt) between 0.01% and 1% and in some cases between 0.05% and 0.5%.

In this embodiment, the additives $23_1$-$23_B$ are organic additives such as amine additives or any other additives, including tertiary amine additives. In this embodiment, the amine additives $23_1$-$23_B$ include triethylene diamine (TEDA). In other embodiments, the amine additives $23_1$-$23_B$ may include triethylamine (TEA), pyridine, pyridine-4-carboxylic acid (P4CA), quinuclidine, quinolaxine, ethyl triethylene diamine, 1,6-hexanediamine, pyrazine, carbazole, 1,3,5-triazine, mixtures thereof and the like.

In some embodiments, the active particles $17_1$-$17_p$ may comprise in weight percent of the organic (e.g., TEDA) additives $23_1$-$23_B$ upon total weight of the active particles $17_1$-$17_p$(wt/wt) at least 0.5%, in some cases at least 1%, in some cases at least 5%, in some cases at least 10%, in some cases at least 15% and in some cases even more. For example, in some embodiments, the active particles $17_1$-$17_p$ may comprise in weight percent of the organic (e.g., TEDA) additives $231$-$23s$ upon total weight of the active particles $17_1$-$17_p$ (wt/wt) between 0.5% and 15%, and in some cases between 1% and 10%.

In this embodiment, at least the bulk (i.e., the bulk or the entirety) of the active particles $17_1$-$17_p$ are substantially uniform in size. For instance, in some embodiments, at least a majority, in some cases at least 60%, in some cases at least 70%, in some cases at least 80%, in some cases at least 90%, and in some cases even more (e.g., 100%) of the active particles $17_1$-$17_p$ are substantially uniform in size.

Substantial uniformity in size of the active particles $17_1$-$17_p$ may be characterized in many ways.

For example, in this embodiment, each active particle $17i$ has dimensions $C_1$, $C_2$ that are normal to one another and each of the dimensions $C_1$, $C_2$ of the active particle $17i$ is substantially uniform for at least the bulk (i.e., the bulk or the entirety) of the active particles $17_1$-$17_p$. For example, in some embodiments, a ratio of a standard deviation al of the dimension $C_1$ over an average dimension $C_{1\text{-}avg}$ for the active particles $17_1$-$17_p$ may be no more than 0.35, in some cases no more than 0.25, in some cases no more than 0.15, in some cases no more than 0.1, in some cases no more than 0.01 and in some cases even less, and/or a ratio of a standard deviation $\sigma_2$ of the dimension $C_2$ over an average dimension $C_{2\text{-}avg}$ for the active particles $17_1$-$17_p$ may be no more than 0.35, in some cases no more than 0.25, in some cases no more than 0.15, in some cases no more than 0.1, in some cases no more than 0.01 and in some cases even less.

In this embodiment, each active particle $17_1$ is spherocylindrical and its dimension $C_1$ is a diameter D and its dimension $C_2$ is a length of the active particle $17_1$. The ratio of the standard deviation on of the diameter D over the average diameter $D_{avg}$ for the active particles $17_1$-$17_p$ may be no more than 0.35, in some cases no more than 0.25, in some cases no more than 0.15, in some cases no more than 0.1, in some cases no more than 0.01 and in some cases even less, and/or a ratio of the standard deviation oat of the length L over the average length $L_{avg}$ for the active particles $17_1$-$17_p$ may be no more than 0.35, in some cases no more than 0.25, in some cases no more than 0.15, in some cases no more than 0.1, in some cases no more than 0.01 and in some cases even less. In other embodiments, the active particles $17_1$-$17_p$ may have any other appropriate shape such as, for example, a spherical shape (in which case each of their dimensions $C_1$, $C_2$ is their diameter) or a cylindrical shape.

More particularly, in this embodiment, the active particles $17_1$-$17_p$ have a uniform particle size distribution, i.e., are monodisperse. One or both of the dimensions $C_1$, $C_2$ (e.g., the diameter D and/or the length) of the active particles $17_1$-$17_p$) may thus be substantially uniform as discussed above.

As an example, in some embodiments, the active particles $17_1$-$17_p$ may have their diameter D of 1.4 mm and the length L between 1.3 and 1.4 mm with the average length $L_{avg}$ of 1.36 mm.

Furthermore, in some embodiments, an aspect ratio $C_1/C_2$ of the dimensions $C_1$, $C_2$ of an active particle $17_1$ may be 1 or close to 1 for at least the bulk of the active particles $17_1$-$17_p$. For instance, in some embodiments, the aspect ratio C1/C2 of the dimensions $C_1$, $C_2$ of the active particle $17_1$ may be between 0.8 and 1.2, in some cases between 0.85 and 1.15, in some cases between 0.9 and 1.1, in some cases between 0.95 and 1.05, and in some cases 1 for at least the bulk of the active particles $17_1$-$17_p$.

In this embodiment, the active particles $17_1$-$17_p$ are made using a compression process (e.g., a tableting process) to achieve this shape control, as further described below. The active particles $17_1$-$17_p$ may be made using any other suitable process in other embodiments.

The size of the active particles $17_1$-$17_p$ may be controlled to enhance the performance of the filter 11. Notably, in this embodiment, the active particles $17_1$-$17_p$ may be designed so as to avoid being too large or too small.

For example, in some embodiments, the average diameter $D_{avg}$ of the active particles $17_1$-$17_p$ may be between 0.5 mm and 2.5 mm, in some cases between 1 mm and 2 mm, in some cases between 1.1 and 1.9 mm, in some cases between 1.2 mm and 1.8 mm, in some cases between 1.3 and 1.7 mm, in some cases between 1.4 and 1.6 mm.

In some embodiments, the average length $L_{avg}$ of the active particles $17_1$-$17_p$ may be between may be between 0.5 mm and 2.5 mm, in some cases between 1 mm and 2 mm, in some cases between 1.1 and 1.9 mm, in some cases between 1.2 mm and 1.8 mm, in some cases between 1.3 and 1.7 mm, in some cases between 1.4 and 1.6 mm.

In this embodiment, the active particles $17_1$-$17_p$ are loose in the container 13. The active particles $17_1$-$17_p$ are not bonded or otherwise attached to one another in the filter 11. This looseness of the active particles $17_1$-$17_p$ may enhance performance of the filtering medium 15 and/or allow the filtering medium 15 to be shaped as desired more easily.

The container 13 holds the filtering medium 15. In this embodiment, the container 13 is a canister that also comprises the connector 57 to connect the filter 11 to the filter mount 56x of the facepiece 12. The container 13 may be implemented in any suitable way. For example, in this embodiment, and with further reference to FIG. 8, the container 13 comprises a rigid body 80, which may be made of metallic, polymeric or any other suitable material and defines a cavity 82 in which the filtering medium 15 is retained. Filter 11a shown in FIG. 4 may also include a similar container.

In this embodiment, the filtering medium 15 occupies at least a substantial part (i.e., a substantial part or an entirety) of a volume of the cavity 82 of the container 13. For example, in some embodiments, the filtering medium 15 may occupy at least a majority (i.e., a majority or the entirety) of the volume of the cavity 82 of the container 13. For instance, in some embodiments, the filtering medium 15 may occupy at least 60%, in some cases at least 70%, in some cases at least 80%, in some cases at least 90%, and in some cases even more (e.g., 100%) of the volume of the cavity 82 of the container 13.

The filtering medium 15 may result in a resistance to airflow of the filter 11 that is relatively low, which in turns entails that a respiratory resistance of the filter 11 is relatively low, thus allowing the wearer to breathe well when wearing the filter 11. Notably, in some embodiments, the resistance to airflow of the filter 11 may be lower than existing commercial activated carbon-based filters.

The resistance to airflow of the filter 11 may be evaluated in any suitable way. For example, in some embodiments, the resistance to airflow of the filter 11 can be measured as a pressure drop ΔP across the filtering medium 15. For example, in some embodiments, a ratio pressure drop ΔP/T of the pressure drop ΔP across the filtering medium 15 over a thickness T of the filtering medium 15 over which the pressure drop ΔP occurs may be no more than 65 Pa/cm, in some cases no more than 60 Pa/cm, in some cases no more than 55 Pa/cm, in some cases no more than 50 Pa/cm, in some cases no more than 45 Pa/cm, in some cases no more than 40 Pa/cm, in some cases no more than 35 Pa/cm and in some cases even less.

For example, in some embodiments, the filter 11 comprising the filtering medium 15 may exhibit a reduction in breathing resistance compared to a filter comprising a commercially-available filtering medium such as, for example, ASZM-TEDA activated carbon from CalgonCarbon Corp. of at least 25%, in some cases at least 30%, in some cases at least 35%, in some cases at least 40%, in some cases at least 45%, in some cases at least 50% and in some cases even more. For instance, in some examples, the pressure drop ΔP of the filtering medium 15 but with unimpregnated activated carbon particles prepared as discussed herein may be between 65-75 Pa, while a filtering medium of commercially-available ASZM-TEDA activated carbon from Calgon Corp. having a similar size may exhibits a pressure drop across it between 135-150 Pa.

The filter 11, including the filtering medium 15, may be manufactured in any suitable way.

Figure 10:
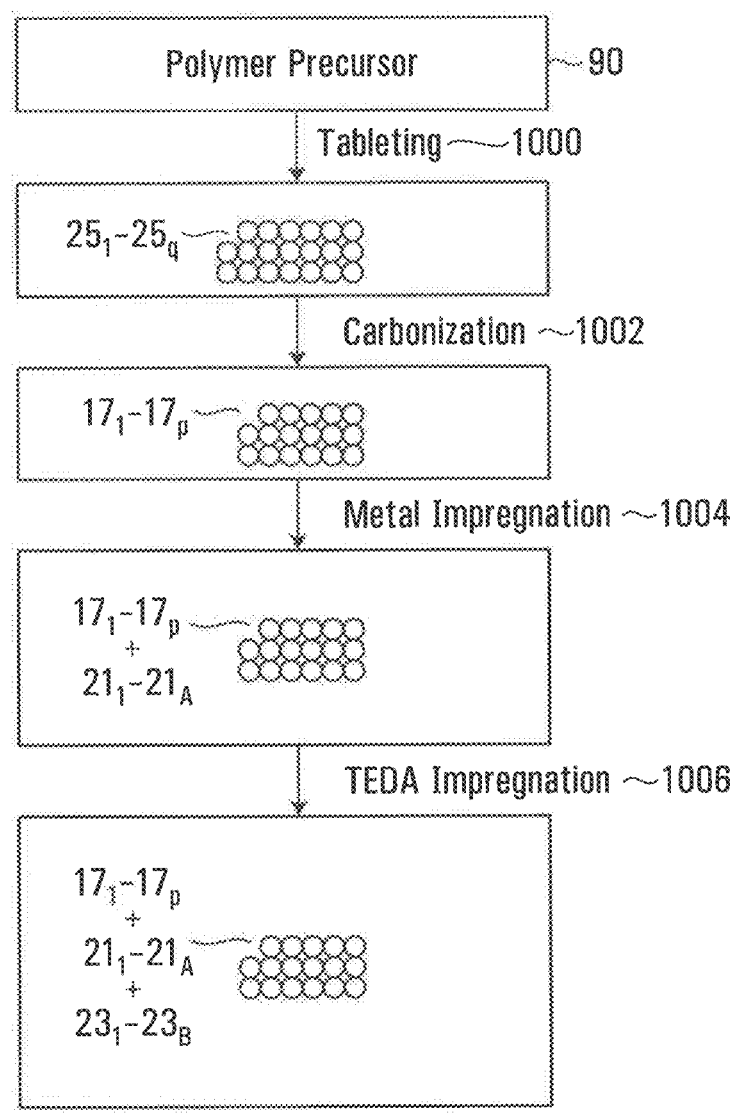
FIG. 10 shows an example of a process for making the filtering medium in accordance with an embodiment of the invention.

For example, in this embodiment, and with further reference to FIG. 10, the active particles $17_1$-$17_P$ are initially prepared from a powder of the polymeric precursor 90 which is compressed into precursory particles $25_1$-$25_O$ having a selected shape using a compression process at a compression step 900. In this example, the compression process is a tableting process. The resulting particles $25_1$-$25_O$ have a uniform shape and a monodisperse particle size distribution (i.e., in this embodiment, the particles $25_1$-$25_O$ have diameter of 1.4 mm and a length between 1.3 and 1.4 mm with a mean length of 1.36 mm). In other embodiments, the parameters of the tableting process (e.g., compression force, compaction pressure, etc.) may be adjusted to modify the size of the particles $25_1$-$25_O$ while ensuring a monodisperse particle size distribution. In other embodiments, other processes (e.g., pelletizing, etc.) may be used to produce particles of a variety of shape and size, the shape of the particles $25_1$-$25_O$ being uniform and the particles $25_1$-$25_O$ having a monodisperse particle size distribution.

In this embodiment, the polymeric precursor 90 includes PVDC and the precursory particles $25_1$-$25_O$ are particles of PVDC. In other embodiments, PVDF, a PVDC copolymer, a PVDF copolymer, or any other suitable copolymer may be used as the polymeric precursor 90.

Then, in this embodiment, the particles $25_1$-$25_O$ are subjected to a carbonization step 902. In this example, the particles $25_1$-$25_O$ are first heated up to 700° C. over 24 hours under inert atmosphere. The temperature is then increased to 900° C. for 3 hours in an atmosphere of $CO_2$ which results in the active particles $17_1$-$17_P$ including their pores $19_1$-$19_T$ which can trap the contaminants or other noxious agents. The temperature profile, the heating duration as well as gas flow parameters may be adjusted according to the size and shape the particles $25_1$-$25_O$.

In this embodiment, the active particles $17_1$-$17_P$ are then subjected to a metal impregnation step 904. The active particles $17_1$-$17_P$ are pre-treated by soaking in a concentrated solution of nitric acid overnight. In a second step, the active particles $17_1$-$17_P$ are then soaked in concentrated solutions of soluble metals including copper, zinc, molybdenum and silver at a concentration no higher than the imbibing limit of the particles. The active particles $17_1$-$17_P$ are then dried and heated at a temperature of 180-200° C. under inert atmosphere resulting in the active particles $17_1$-$17p$ comprising the metal additives $21_1$-$21_A$ (i.e., copper, zinc, molybdenum and silver occurring as metal oxides) impregnated into their pores $19_1$-$19_T$ and/or onto their surface.

Then, in this embodiment, the active particles $17_1$-$17_P$ comprising the metal additives $21_1$-$21_A$ are subjected to a TEDA impregnation step 906. The active particles $17_1$-$17_P$ containing the metal additives $21_1$-$21_A$ are combined with TEDA (neat) at 3% wt/wt. The temperature is then increased to 85° C. for 48 hours under vacuum resulting in the active particles $17_1$-$17_P$ comprising the metal additives $21_1$-$21_A$ and the TEDA additives $23_1$-$23_B$ deposited into their pores $19_1$-$19_T$ and/or onto their surface.

In other embodiments, the TEDA impregnation step may be performed prior to the metal impregnation step or concurrently with the metal impregnation step.

As an example, active particles having a particle size of 1.4 mm diameter and 1.4 mm length and impregnated with copper, zinc, molybdenum, silver and TEDA were prepared according to the present disclosure. The active particles prepared had a metal loading of 10.7% wt/wt (that is, the weight percent of metals upon total weight of the active particles). The active particles were evaluated by measurement of the breakthrough time against noxious gas as listed in the NIOSH CBRN APR Cap1 and MIL-PRF-51560C requirements (i.e. the time before breakthrough of the noxious gas through the filter) and results are shown in Table 1

TABLE 1

| carbon | Breakthrough time (mins) | | | | | |
|---|---|---|---|---|---|---|
| | Cyanogen Chloride | Hydrogen Cyanide | Phosgene | Sulfur Dioxide | Cyclohexane | DMMP |
| ASZM-TEDA specification (min-min average) | 44-55 (aged 39-45) | 26-28 | 19-25 | n/a | n/a | 175 |
| Commercial ASZM-TEDA[1] | 49 | 43 | 21 | 12 | 13 | 278 |

TABLE 1-continued

| carbon | Breakthrough time (mins) | | | | | |
|---|---|---|---|---|---|---|
| | Cyanogen Chloride | Hydrogen Cyanide | Phosgene | Sulfur Dioxide | Cyclohexane | DMMP |
| Active particles | 96 | 45 | 19 | 16 | 20 | 420 |

Table 1 shows that the breakthrough times of the activated particles exceeds the minimum requirements specified in the ASZM-TEDA standard and performs better than commercially-available alternatives against cyanogen chloride, hydrogen cyanide, sulfur dioxide, cyclohexane and dimethyl methylphosphonate (DMMP).

The mask 10 may be configured and/or made in any other suitable way in other embodiments.

While in this embodiment the filter 11 is part of the respirator mask 10, in other embodiments, the filter 11 may be part of another device or used for other filtering applications.

Figure 11:
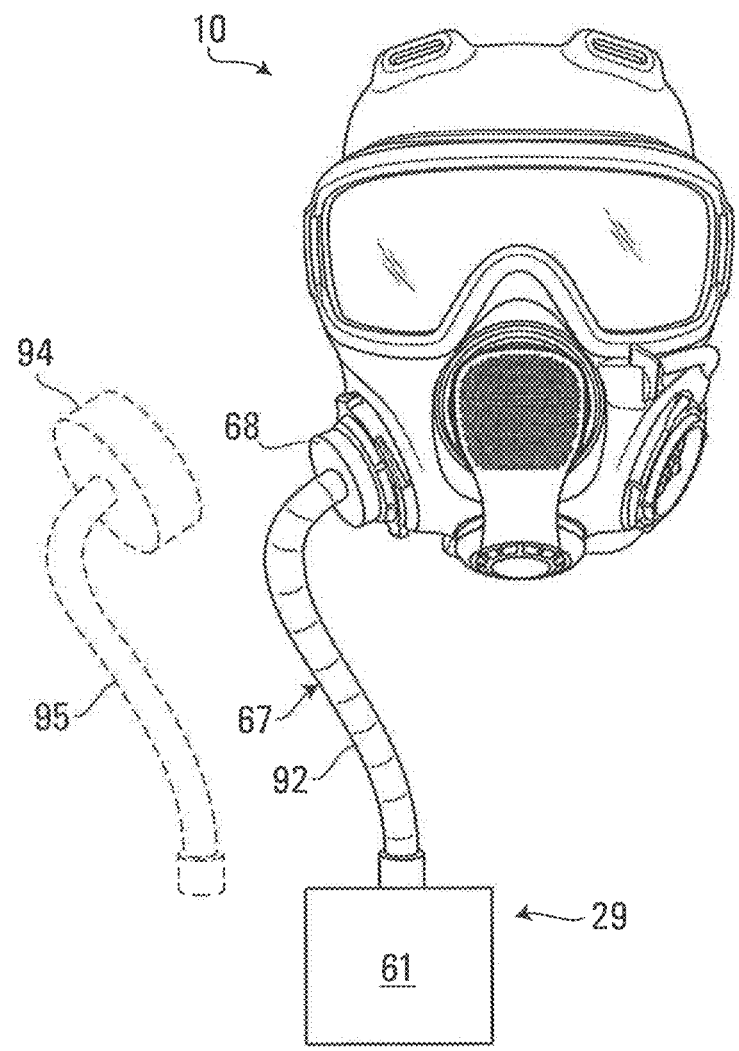
FIG. 11 shows a variant in which the filter is part of a remote air supply connected to the respirator mask.

For example, in some embodiments, as shown in FIG. 11, the filter 11 may be part of a remote air supply 61 that is supported remotely from the mask 10 (e.g., on a belt or on a back of the wearer) and supplies clean air which is deliverable to the mask 10 via a conduit 67. The remote air supply 61 may comprise a powered filtering apparatus (e.g., in which case the mask 10 and the remote air supply 61 may constitute a powered air-purifying respirator).

As another example, in some embodiments, the filter 11 may be used for other filtering purposes, including but not limited to biogas purification, gas storage and delivery, hydrogen production, mercury removal, drinking water treatment, effluent water treatment, swimming pool water treatment, food and beverage processing, industrial purification (e.g. color removal, protein and organic impurities removal), industrial catalysis, gold recovery, vehicle air purification systems, odor control, poison treatment, cigarette filters and filters for hot cells construction.

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed:

1. A protective mask, comprising:
a lens configured to allow a user of the mask to see therethrough;
a sealing portion configured to at least partially seal an inner volume of the mask from an ambient atmosphere; and
a filter interface configured to removably attach a filter to the mask, such that an outside gas can travel through the filter and the filter interface into the inner volume of the mask, wherein, the filter includes a container, a first mechanical filter screen disposed between an interior of the container and the outside gas, a second mechanical filter screen disposed between the interior of the container and the inner volume of the mask, and a filtering medium disposed in the container, said filtering medium comprising active particles that are loose, substantially uniform in size, and derived from a polymeric precursor, and wherein, the active particles comprise metallic additives and organic additives, a ratio of standard deviation of the active particles' dimensions compared to an average particle dimension is less than 0.35, and the polymeric precursor comprises at least one of polyvinylidene chloride (PVDC), polyvinylidene fluoride (PVDF), a PVDC copolymer, or a PVDF copolymer.

2. The mask of claim 1, wherein the outside gas is provided from at least one of an ambient atmosphere, a pressurized gas tank, or gas line.

3. The mask of claim 1, wherein the mask is a CBRN mask.

4. The mask of claim 1, further comprising an exhaust valve that is configured to allow gas to escape from the inner volume of the mask without passing back through the filter.

5. The mask of claim 1, wherein the active particles have a uniform particle size distribution, with the diameter D of 1.4 mm and length L between 1.3 and 1.4 mm.

6. The mask of claim 1, wherein the active particles comprise metallic additives in weight percent of the metallic additives upon the total weight of the active particles greater than 5% (wt %).

7. The mask of claim 1, wherein the active particles comprise copper in weight percent of the copper upon the total weight of the active particles greater than 5% (wt %).

8. The mask of claim 1, wherein the active particles comprise zinc in weight percent of the zinc upon the total weight of the active particles greater than 5% (wt %).

9. The mask of claim 1, wherein the active particles comprise molybdenum in weight percent of the molybdenum upon the total weight of the active particles greater than 1% (wt %).

10. The mask of claim 1, wherein the active particles comprise silver in weight percent of the silver upon the total weight of the active particles greater than 0.05% (wt %).

11. The mask of claim 1, wherein the active particles comprise in weight percent of the organic additives upon the total weight of the active particles greater than 1%.

12. The mask of claim 1, wherein the breakthrough times of the activated particles exceeds the minimum requirements specified in the ASZM-TEDA standard.

13. The mask of claim 1, wherein a ratio pressure drop $\Delta P/T$ of the pressure drop $\Delta P$ across the filtering medium over a thickness T of the filtering medium over which the pressure drop $\Delta P$ occurs is less than 45 Pa/cm.

14. A filter configured for use with a protective mask, said filter comprising:
- a container including an interface for removably securing the filter to the exterior of the protective mask;
- a first mechanical filter screen disposed between an interior of the container and atmosphere;
- a second mechanical filter screen disposed between an interior of the container and an inner volume of the protective mask; and
- a filtering medium disposed in the container, said filtering medium comprising active particles that are loose, substantially uniform in size, and derived from a polymeric precursor,
- wherein, the active particles comprise metallic additives and organic additives,
- a ratio of standard deviation of the active particles' dimensions compared to an average particle dimension is less than 0.35, and
- the polymeric precursor comprises at least one of polyvinylidene chloride (PVDC), polyvinylidene fluoride (PVDF), a PVDC copolymer, or a PVDF copolymer.

15. The filter of claim 14, wherein all of the active particles share a substantially uniform spherocylindrical, spherical, or cylindrical shape.

16. The filter of claim 14, wherein a ratio pressure drop $\Delta P/T$ of the pressure drop $\Delta P$ across the filtering medium over a thickness T of the filtering medium over which the pressure drop $\Delta P$ occurs is less than 45 Pa/cm.

17. The filter of claim 14, wherein the active particles have a uniform particle size distribution, with the diameter D of 1.4 mm and length L between 1.3 and 1.4 mm.

18. A process for making a filter, comprising:
- providing a container including a filter interface for removably securing the filter to the exterior of the protective mask;
- providing a first mechanical filter screen disposed between an interior of the container and a gas intake of the filter;
- providing a second mechanical filter screen disposed between an interior of the container and the filter interface; and
- disposing a filtering medium in the container, said filtering medium comprising active particles that are loose, substantially uniform in size, and derived from a polymeric precursor,
- wherein, the active particles comprise metallic additives and organic additives,
- a ratio of standard deviation of the active particles' dimensions compared to an average particle dimension is less than 0.35, and
- the polymeric precursor comprises at least one of polyvinylidene chloride (PVDC), polyvinylidene fluoride (PVDF), a PVDC copolymer, or a PVDF copolymer.

19. The filter of claim 14, wherein the ratio of standard deviation of the active particles' dimensions compared to an average particle dimension is less than 0.25.

20. The filter of claim 14, wherein the ratio of standard deviation of the active particles' dimensions compared to an average particle dimension is less than 0.1.

* * * * *